United States Patent [19]

Atkinson

[11] Patent Number: 4,473,958
[45] Date of Patent: Oct. 2, 1984

[54] FILING GUIDE
[75] Inventor: Renwick S. Atkinson, Portland, Oreg.
[73] Assignee: Carlton Company, Milwaukie, Oreg.
[21] Appl. No.: 439,775
[22] Filed: Nov. 8, 1982
[51] Int. Cl.³ ............................................ B23D 63/00
[52] U.S. Cl. ..................................... 33/202; 76/25 A
[58] Field of Search .................. 33/202; 76/25 A, 36, 76/74

[56] References Cited
U.S. PATENT DOCUMENTS

| | | |
|---|---|---|
| 2,737,830 | 3/1956 | Silverson et al. |
| 2,898,782 | 8/1959 | Consoletti ............................. 76/36 |
| 3,055,115 | 9/1962 | Tyrrell. |
| 3,365,805 | 1/1968 | Carlton ................................. 33/202 |

Primary Examiner—William D. Martin, Jr.
Attorney, Agent, or Firm—Kolisch, Hartwell, Dickinson & Anderson

[57] ABSTRACT

A filing guide for saw chain which includes a plate having a flat expanse joining with a curved expanse at the forward end of the guide which forms a cylinder. The guide is useable, with one side facing upwardly and the cylinder seated in a pocket defined in a saw chain, to guide a file during filing of a depth gauge and a safety projection in the saw chain. With the guide turned over from this position, and the cylinder again seated in the pocket, the guide is useable to guide a file during filing of a cutting edge in the saw chain.

8 Claims, 6 Drawing Figures

U.S. Patent  Oct. 2, 1984  Sheet 1 of 2  4,473,958
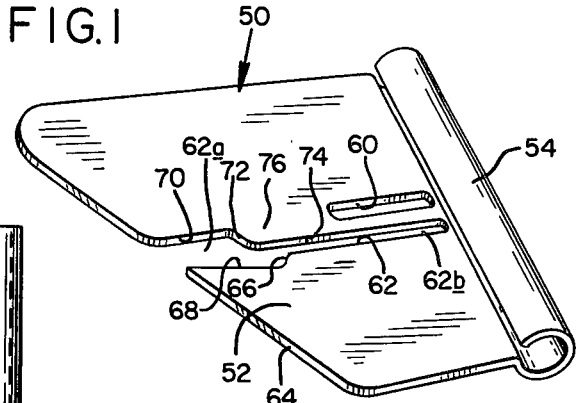
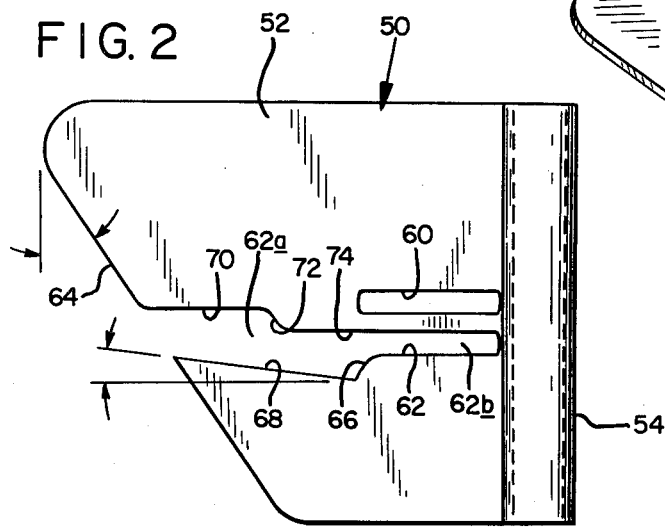
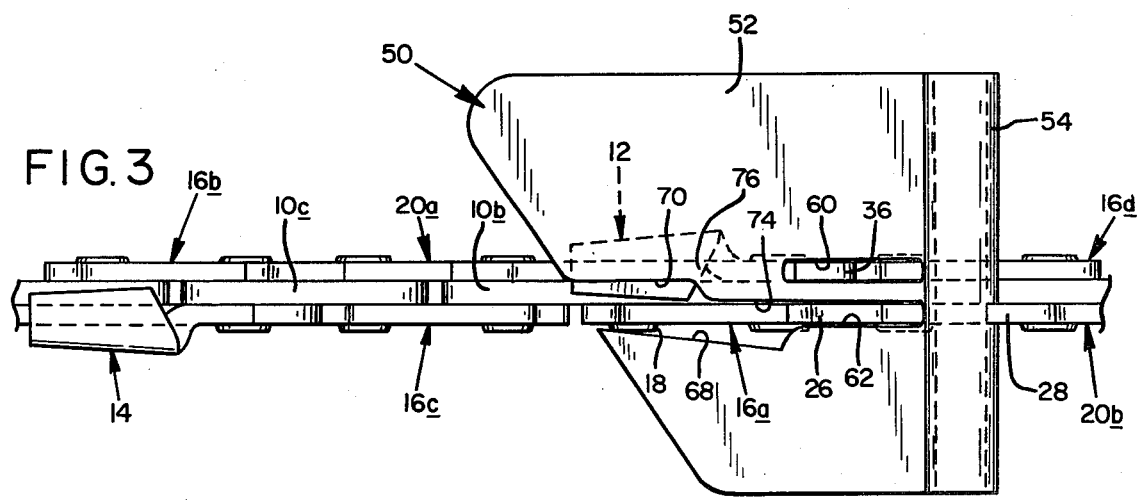
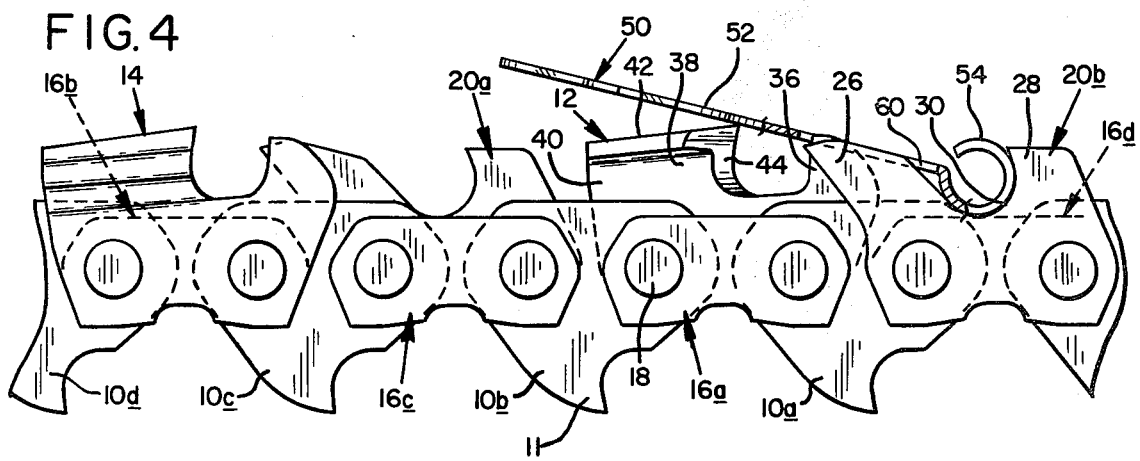

FILING GUIDE

BACKGROUND AND SUMMARY OF THE INVENTION

This invention relates to a filing guide, and more particularly to a filing guide useable in connection with saw chain which facilitates filing of parts of the chain for the purpose of maintaining the cutting performance of the chain.

The usual cutter link in saw chain includes a body portion at the base of the link provided with rivet holes useable in connecting the link to other saw chain links. Integral with this body portion at the forward end of the cutter link is an upwardly projecting depth gauge and integral with the body portion at the rear end of the link and separated from the depth gauge by a gullet is an upwardly projecting cutter formed by a side plate which joins with the body portion and a top plate. Periodically, cutting edges at the forward extremity of the cutter provided along leading edge portions of the side plate and top plate must be filed to sharpen the cutter, and this filing must be performed in a precise manner if the cutter link is to cut properly. Furthermore, after the cutter in the cutter link is filed away with use, the height of the depth gauge should be reduced, to maintain proper clearance between the top of the depth gauge and the cutting edge in the top plate of the cutter. Additionally, in so-called safety chain constructed for anti-kickback characteristics, a side link in the chain on the opposite side of the chain from the cutter link may be provided which has an upward projection disposed laterally of and in the vicinity of the depth gauge which functions to limit penetration of the cutter. This projection, too, optimally should be filed periodically to maintain a proper relation between the height of this projection, the height of the depth gauge and the height of the cutting edge at the leading end of the cutter.

Various types of filing guides have been proposed in the past. Most have been rather cumbersome, and as a corollary expensive, which has detracted from wide spread use, and use by chain saw operators in the field where it is impractical to carry such devices around. Plate-type filing guides have also been proposed, and while these have performed satisfactorily in connection with the filing of certain types of chain, they have not lent themselves for use with certain newly developed safety chains which include safety links with upper expanses functioning to inhibit kickback.

A general object of this invention is to provide an improved filing guide useable in the filing of cutter links in saw chain which is simple and easily carried, and permits a person of only ordinary skill precisely to file operating parts of cutter links in a saw chain, as well as anti-kickback safety projections which may be included in the chain.

The filing guide of the invention takes the form of a plate having a flat expanse, and means forming an elongate shoulder extending transversely of the plate at the forward end of the plate. This shoulder serves to elevate the forward end of the guide to set the proper angle for the expanse in the plate extending rearwardly from the shoulder-forming means.

As contemplated by a preferred embodiment of the invention, the guide may be inverted by turning the guide side edge over side edge. The shoulder-forming means above referred to takes the form of a cylindrical expanse extending transversely of the guide, with one side of this cylindrical expanse projecting outwardly from one face of the flat expanse in the plate and the other side of the cylindrical expanse projecting outwardly from the opposite face of the flat expanse in the guide. With the guide positioned so that one face of the flat expanse faces downwardly, the cylindrical expanse mentioned serves to elevate the forward margin of the guide, with the guide inclining upwardly from where so elevated and in position to facilitate the filing of a depth gauge and a safety projection. Turned over, the cylindrical expanse elevates the forward margin of the guide with the flat expanse of the guide inclining downwardly from this forward margin and at a proper angle to facilitate the filing of a cutter in a cutter link.

These and various other objects and advantages are attained by the invention, which will become more fully apparent from a reading of the following description, to be taken in conjunction with the accompanying drawings, wherein:

FIG. 1 is a perspective view of the filing guide;

FIG. 2 is a plan view of the filing guide;

FIG. 3 is a view illustrating the guide positioned on saw chain looking downwardly on the guide;

FIG. 4 is a side elevation of the saw chain and guide as pictured in FIG. 3;

DETAILED DESCRIPTION OF A PREFERRED EMBODIMENT OF THE INVENTION

Figure 5:
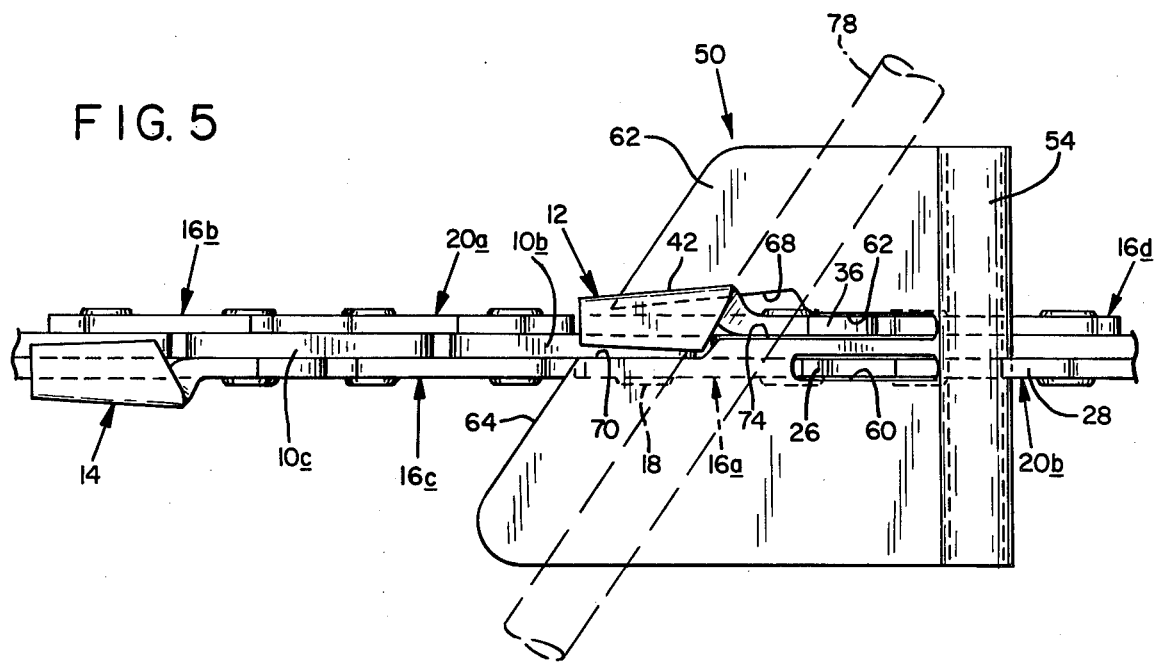
FIG. 5 is a view similar to FIG. 3, but showing the guide inverted and seating in a different position on the saw chain.

Referring now to the drawings, and considering first of all the construction of the saw chain which is to be filed utilizing the filing guide, the chain includes a number of center links such as those shown at 10a, 10b, 10c, and 10d, which are drive links and which follow one another along the length of the saw chain. The drive links have sprocket-engaging portions 11 projecting downwardly from the main bodies of the links which are utilized in driving the chain.

In the chain illustrated, adjacent pairs of center links are pivotally joined together by left and right hand cutter links disposed alternately on opposite sides of the saw chain. The cutter links are side links in the chain, and opposite each cutter link in the chain is another side link, namely a tie strap side link. Thus, and referring to FIGS. 3 and 4, center links 10a, 10b are pivotally interconnected by left hand cutter link 12 and an opposite tie strap link 16a. These side links are fastened to the drive links with rivets, such as rivet 18. Right hand cutter link 14 and an opposite tie strap side link 16b are pivotally connected to drive links 10c, 10d with similar rivets.

The chain illustrated is a so-called safety chain or anti-kickback chain, and includes a safety link on the opposite side of the chain from each cutter link, and directly in front of the cutter link. In the case of cutter link 14 the safety link is shown as 20a, and in the case of cutter link 12 at 20b. On the opposite side of each safety link is a tie strap side link indicated for the two safety links at 16c and 16d, respectively. The safety link and opposing side link are pivotally connected to the drive links which they span by additional rivets.

Briefly describing a safety link, and with reference to link 20b, the link includes a leading projection 28 projecting upwardly from the body of the link adjacent the forward end of the link and a trailing projection 26 projecting upwardly from the body of the link adjacent the rear end of the link. Defined between the leading and trailing projections is a pocket or gullet 30 defined by a substantially cylindrically curved edge surface. The base of this pocket lies substantially at the level of the top of the tie strap side link on the opposite side of the chain from the safety link.

Each cutter link, and considering left hand cutter link 12, includes a depth gauge joined to the body of the link and projecting upwardly from such body at the forward end of the link, shown at 36. Joined to the rear of the body in the cutter link is a cutter 38 formed by a side plate 40 which joins with the main body of the link and projects upwardly therefrom, and a top plate 42 which inclines slightly downwardly progressing rearwardly in the link. The leading edge of the side plate and the leading edge of the top plate, and the transitional region where the top plate and side plate join, are sharpened to provide a cutting edge 44 in the cutter.

Because of the incline in the top plate, and after repeated filing of the cutter for sharpening purposes, which serves to progressively shorten the side plate and top plate, the height of the cutting edge in the cutter is gradually reduced.

The height of depth gauge 36 at the forward end of the cutter link is slightly less than the height of the cutting edge in the cutter and this difference in height is sometimes referred to as the clearance in the cutter link. The depth gauge rides in the bottom of the kerf produced by the saw chain and serves to limit the depth of penetration of the cutting edge which follows the depth gauge. As the height of the cutting edge is reduced by repeated sharpening, it is necessary also to lower the height of the depth gauge if the cutter link is to continue to operate in proper fashion.

A good portion of trailing projection 26 in the safety link is disposed directly laterally opposite the depth gauge of the cutter link which traits the safety link. As discussed in co-pending application Ser. No. 301,840 entitled ANTI-KICKBACK SAW CHAIN filed Sept. 14, 1981, now U.S. Pat. No. 4,425,830, on the saw chain described herein travelling around the nose or end of a chain saw bar, projection 26 swings, about the rivet which connects the rear of the safety link to a drive link, upwardly and forwardly relative to the adjacent depth gauge. This action, and a lifting which tends to occur of the forward end of the safety link, minimizes penetration of the cutter with the cutter travelling over the nose of the chain saw bar. Leading projection 28 normally might have a height which is approximate to or slightly less than the height of the cutter in the cutter link in front of the safety link, and ordinarily there is no need to file this link during use of the chain. The height of the trailing projection, however, should be reduced with reduction in the height of the depth gauge, for optimum cutting performance in the saw chain.

The filing guide of the invention has been given the reference numeral 50 in the drawings. As illustrated, and referring to FIGS. 1 and 2, the guide comprises a plate, preferably a metallic plate which includes a flat expanse 52 making up a major portion of the guide, and means at the forward end of the guide forming elongate shoulders which extend transversely or between opposite side edges of the guide. Specifically, this shoulder-forming means comprises a cylindrically curved expanse in the plate, shown at 54, which forms, in essence, a hollow cylinder extending transversely along the forward margin of the guide integrally joined to flat expanse 52. The axis of this cylinder lies substantially in the plane of flat expanse 52. The cylinder provides an elongate transversely extending shoulder on one side of the guide projecting outwardly from the face of flat expanse 52 located on this one side of the guide, and another elongate shoulder projecting outwardly from the other face of flat expanse 52 on the other side of the guide.

Flat expanse 52 is provided with a pair of slots indicated at 60 and 62.

Slot 60 is closed at opposite ends, the forward end of the slot being adjacent cylindrically curved expanse 54 and the rear end being located in the mid region of the flat expanse 52.

Slot 62, on the other hand, extends from a closed end located adjacent the cylindrically curved expanse to an open end where such joins with rear margin or edge 64 of the flat expanse. Portion 62b of slot 62 which forms the forward extent of the slot may have essentially the width of slot 60 which it parallels. Portion 62a of the slot which forms the rear extent of the slot is wider than portion 62b. In FIG. 1, such wider portion is defined, along the base of the slot as shown in FIG. 1, by curved edge 66 and an inclined edge 68. Along the top of the slot the wider portion of the slot is defined by horizontal edge 70, inclined edge 72 and a portion of horizontal edge 74 which continues to form the upper edge of the rear portion of the slot.

Preferably, rear edge 64 of the guide is inclined relative to the axis of the cylinder formed by curved expanse 54. In a typical guide, this angle of incline might be 35 degrees. The edge provides a visual reference line useable in properly positioning a file during one filing operation.

The filing guide described may be used both in the filing of the depth gauge and projecting portion 26, and also in the filing of cutting edge 44, with either left or right hand cutter links.

Further explaining, and referring to FIGS. 3 and 4, in the filing of the depth gauge and the trailing projection which is immediately adjacent in a left hand cutter link, the guide is positioned with the longer of the two slots, i.e., slot 62, receiving the upper extremity of projection 26. The shorter slot 62 receives the upper extremity of the depth gauge in the cutter link. The cylindrically curved expanse seats within curved pocket 30 provided between projections 26, 28. Expanse 52 of the guide includes a portion 76 located rearwardly of slot 60 which overlies the top plate in the cutter link. As a consequence with the guide so positioned, such will have an inclined position viewing the guide and saw chain in side elevation as in FIG. 4. The cylindrically curved expanse serves properly to seat the forward end of the guide with elevating of the forward margin of flat expanse 52. The inclination is upwardly progressing rearwardly, and occurs by reason of portion 76 resting on the forward extremity of the top plate in the cutter. With the filing guide so positioned, a file moved over the top face of the flat expanse will be effective to remove any portions of the depth gauge and projection 28 protruding above the top face of the guide. This produces proper contouring of the depth gauge and projection with such related to cutting edge position.

Figure 6:
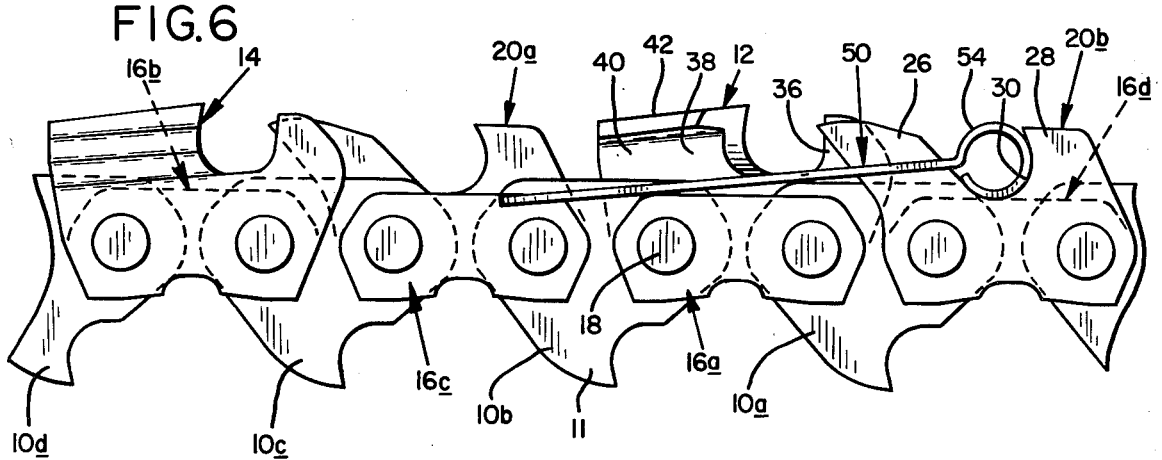
FIG. 6 is a side elevation of the guide and saw chain illustrated in FIG. 5.

For the purpose of filing the cutting edge in the cutter, the guide is placed in a position which is inverted side edge over side edge from the position shown in FIGS. 3 and 4, i.e., the position of the guide illustrated in FIGS. 5 and 6. With the guide so positioned, and properly seated on a left hand cutter link, cylindrical expanse 54 again seats in pocket 30. Slot 60 receives the trailing projection in a safety link. The forward portion of slot 62 receives the depth gauge of the cutter link. Edge 70 lies along side the drive link connected to the rear end of the cutter link, with portions of the flat expanse immediately adjacent resting on the top of a tie strap link opposite the cutter link. Edge 68 extends adjacent the surface forming the outer side of side plate 40 of the cutter link. The open wider portion of slot 62 permits the guide to be positioned by moving the guide rearwardly, with the open end of slot 62 first straddling the cutter, and then dropping the forward part of the guide downwardly to place curved expanse 54 in pocket 30.

When finally properly seated, and as shown in FIG. 6, the cylindrically curved expanse again serves not only to place the forward margin of the guide but also to elevate the forward extremity of the guide's flat expanse. The flat expanse slopes downwardly progressing rearwardly on the chain by reason of its rear margin resting on a tie strap side link. With this position the flat expanse of the guide substantially parallels the top plate of the cutter in the cutter link. The cutting edge may be sharpened by moving a file over the top face of the guide, with such file placed against the cutting edge of the cutter and with the file positioned parallel to indexing edge 64. Such a file is shown in dashed outline at 78.

The guide is useable in a similar manner in filing a left hand cutter. To file the depth gauge and adjacent projection in the safety link with a right hand cutter the guide is inverted from the position shown in FIG. 3 to place slot 60 in proper position to receive the depth gauge and slot 62 in proper position to receive the trailing projection of the safety link. Filing of the cutting edge is accomplished using the guide in a position which is inverted from the position shown in FIGS. 5 and 6.

It should be apparent that a filing guide has been disclosed useable in performing all the filing operations required to maintain a saw chain in proper cutting condition. The guide seats in a secure position with the cylindrically curved expanse of the forward margin of the guide seating within pocket 30. The cylindrically curved expanse elevates the forward margin of the flat expanse in the guide to produce a properly inclined position with the guide used either to file the depth gauge and safety projection, or, with the guide inverted, for the purpose of filing the cutting edge of the same cutter link.

It is claimed and desired to secure by Letters Patent:

1. A filing guide for saw chain, the chain having a cutter link which is a side link in the chain that includes a depth gauge at the forward end thereof and a cutter at the rear end thereof, the cutter including a side plate and a top plate, the chain further including another side link on the other side of the chain from the cutter link having a safety projection disposed laterally of the depth gauge, the filing guide comprising:

a plate having a flat expanse,
a first slot in said expanse of said plate adapted to receive the depth gauge, said slot having a closed forward end which clears the forward end of the depth gauge with the depth gauge received in the slot,
a second slot in said flat expanse beside and paralleling the first slot adapted to receive said projection, said second slot having a closed forward end which clears the forward end of the projection with the projection received in the second slot,
said plate having as an integral part thereof and unifying the plate means forming an elongate shoulder extending transversely of said slots projecting downwardly from said flat expanse and located forwardly of the forward ends of said first and second slots for elevating the forward end of said expanse with the guide mounted on the saw chain,
said flat expanse of said plate including a portion located rearwardly of said first slot for engaging the top plate of the cutter in the cutter link with the guide mounted on the saw chain.

2. The filing guide of claim 1, wherein said means forming said shoulder comprises a cylindrically curved expanse of said plate joined to said plate's flat expanse, the curved expanse curving about an axis extending transversely of said slots.

3. The filing guide of claim 1, wherein said flat expanse terminates at a rear margin which forms the rear end of the guide, said second slot opens to the rear end of the guide and has a portion forming the rear extent of the slot which is wider than the remainder of the slot, the guide when inverted by turning side edge over side edge being positionable with the first slot receiving the projection formerly received by the second slot, the second slot receiving the depth gauge formerly received by the first slot, and said portion of the second slot straddling the side plate in the cutter whose top plate was formerly engaged by said portion of said flat expanse.

4. The filing guide of claim 3, wherein said means forming said shoulder comprises a cylindrically curved expanse of said plate joined to said flat expanse which curved expanse curves about an axis extending transversely of said slots, said curved expanse projecting outwardly from opposite faces of said flat expanse to form said shoulder and another shoulder.

5. A filing guide for saw chain where the saw chain includes a cutter link which is a side link, the cutter link including a depth gauge at the forward end thereof and a cutter at the rear end thereof formed by a side plate and a top plate, the chain further including a safety link which is a side link on the other side of the chain from the cutter link and spaced forwardly of the cutter link, the safety link including a safety projection disposed laterally of the depth gauge of the cutter link and further having means forming a pocket positioned forwardly of said safety projection, the filing guide comprising:

a plate having a flat expanse,
said plate further having, as an integral part of the plate and unifying the plate, means at the forward end of the plate forming shoulders extending between side edges of the plate, the respective shoulders projecting outwardly from opposite faces of the flat expanse in the plate, one shoulder being adapted to seat within said pocket with the guide positioned with one face of the plate's expanse facing downwardly and the other shoulder being adapted to seat within said pocket with the guide inverted and the other face of the plate's expanse facing downwardly, and
first and second slots in the flat expanse of the plate disposed substantially parallel to each other and located rearwardly of said shoulders, the slots extending between forward and rear ends of the flat expanse of the plate, said slots receiving said depth gauge and said projection with either said one face or said other face of the expanse facing downwardly.

6. The filing guide of claim 5, wherein one of said slots opens to the rear end of the guide and has a portion forming the rear extent of the slot which is wider than the remainder of the slot, and said flat expanse includes a portion located rearwardly of the rear end of the other slot, the guide when positioned with one face facing downwardly seating on the saw chain with said portion of the slot straddling the side plate of the cutter, the guide when positioned with the other face facing downwardly seating on the saw chain with said portion of said expanse engaging the top plate of the cutter.

7. The filing guide of claim 5, wherein said means forming the shoulders comprises a cylindrically curved expanse formed in the plate which expanse forms a hollow cylinder disposed with the plane of said flat expanse bisecting the cylinder.

8. A filing guide for saw chain where the saw chain includes a cutter link which is a side link, the cutter link including a depth gauge at the forward end thereof and a cutter at the rear end thereof formed by a side plate and a top plate, the chain further including a safety link which is a side link on the other side of the chain from the cutter link and spaced forwardly of the cutter link, the safety link including a safety projection disposed laterally of the depth gauge of the cutter link and further having means forming a pocket positioned forwardly of said safety projection, the filing guide comprising:

a plate having a flat expanse, said plate further having, as an integral part of the plate and unifying the plate, a cylindrically curved expanse joining with said flat expanse and forming the forward end of the plate, said cylindrically curved expanse forming a hollow cylinder having an axis which extends between opposite side margins of the plate and disposed so that the plane of the flat expanse bisects the cylinder, one side of said cylinder being adapted to seat within said pocket with the guide positioned with one face of the plate's expanse facing downwardly and the other side of said cylinder being adapted to seat within said pocket with the guide inverted and the other face of the plate's expanse facing downwardly, and slot means in said flat expanse located rearwardly of said cylindrically curved expanse receiving said depth gauge and said projection but not the cutter with one face of the plate's expanse facing downwardly and receiving said depth gauge and said projection together with said cutter with the other face of the plate's expanse facing downwardly.

* * * * *